United States Patent [19]
Kilicaslan et al.

[11] Patent Number: 5,059,227
[45] Date of Patent: Oct. 22, 1991

[54] DEVICE FOR FILTERING HOT, DUST-LADEN GASES

[75] Inventors: Muharrem Kilicaslan, Voerde; Hans-Joachim Meier, Alpen; Heiko Rehwinkel, Bottrop; Wolfgang Raue, Duisburg; Gerd Ruther, Essen, all of Fed. Rep. of Germany

[73] Assignee: Deutsche Babcock Werke Energie- und Umwelttechnik AG, Oberhausen, Fed. Rep. of Germany

[21] Appl. No.: 615,443

[22] Filed: Nov. 16, 1990

[30] Foreign Application Priority Data

Nov. 17, 1989 [DE] Fed. Rep. of Germany ....... 3938264

[51] Int. Cl.$^5$ ............................................. B01D 46/24
[52] U.S. Cl. ......................................... 55/490; 55/523
[58] Field of Search ................. 55/523, 490, 494, 498, 55/499

[56] References Cited

U.S. PATENT DOCUMENTS

| | | | |
|---|---|---|---|
| 3,436,898 | 4/1969 | Kaess et al. | 55/523 X |
| 4,629,483 | 12/1986 | Stanton | 55/523 X |
| 4,735,635 | 4/1988 | Israelson et al. | 55/523 X |
| 4,735,638 | 4/1988 | Ciliberti et al. | 55/523 X |
| 4,867,769 | 9/1989 | Oda et al. | 55/523 X |
| 4,960,448 | 10/1990 | Zievers | 55/523 |

Primary Examiner—Charles Hart
Attorney, Agent, or Firm—Max Fogiel

[57] ABSTRACT

A device for filtering hot, dust-laden gases with filter tubes (2) accommodated in a closed housing (1) that contains both a dirty-gas section and a clean-gas section and consisting of hollow structures (9) that have at least one exit that communicates with the clean-gas section and are otherwise closed, characterized in that the edge (11) around the exit from each tube constitutes a base and rests subject to the weight of the tube against a counterpart in the clean-gas section such that the weight of the tube and the difference between the pressure of the gas in the dirty-gas section and that of the gas in the clean-gas section act parallel.

20 Claims, 3 Drawing Sheets

DEVICE FOR FILTERING HOT, DUST-LADEN GASES

BACKGROUND OF THE INVENTION

The invention concerns a device for filtering hot, dust-laden gases with filter tubes.

A high-temperature filter of this genus is known from German Patent 3 515 365. Its tubes are suspended from a perforated high-temperature resistant plate. Each tube has a radially projecting collar at its open end. Each collar has a convex base. The tubes are suspended from the perforated plate by way of the collar and of a soft gasket. The plate divides the filter's housing into two, with the dirty gas in the lower section and the clean gas in the upper section. The clean gas exerts less pressure in its section than the dirty gas does in its section and the difference opposes the weight of the tubes. When the pressure difference increases, in the event of a breakdown or as the result of dynamic processes that occur when the system is turned on and off, for example, even weighted tubes will sometimes lift off their seats.

The perforated plate cannot for reasons of safety be too large, and increasing the output of the plant by accommodating several perforated plates in a single housing is known from European Patent 129 053 for example. There is a clean-gas collecting compartment above each perforated plate, and the tubes must accordingly be mounted in the plate from below. This approach leads to problems when a tube in an operational device becomes defective and must be replaced. The threads between the tubes and their connectors become difficult to unscrew after even a few hours of operation, which leads to a considerable expenditure for assembly.

SUMMARY OF THE INVENTION

The object of the current invention is to improve the generic device for filtering gases in order to simplify the installation and removal of one or more tubes and reliably seal the dirty-gas section from the clean-gas section even during malfunctions.

The invention results in the simplest possible embodiment of the type of prismatic upright filter tube that establishes a seal between a dirty-gas section and a clean-gas section by its own weight alone. Since the difference in pressure between the two sections acts parallel to the weight, the tubes will remain against their seats even when fluctuations occur. The tubes center themselves automatically in their seats. Since they are upright, the tubes can be tilted slightly and thrust first through the upper fixture and then through a counterpart that secures it in the clean-gas section. Installation and, in the opposite sequence, removal are essentially simpler. The advantages of the upright position of the tubes will be especially apparent when collection channels are employed at the clean-gas end to carry it away. The tubes can in this event be suspended in groups or rows and will be easily accessible from inside the housing. The structures that secure the tubes in the clean-gas section can be mounted at the periphery of the collection channels, which is accessible from outside.

BRIEF DESCRIPTION OF THE DRAWINGS

Several embodiments of the invention will now be specified with reference to the drawings, wherein.

DESCRIPTION OF THE PREFERRED EMBODIMENTS

Figure 1:
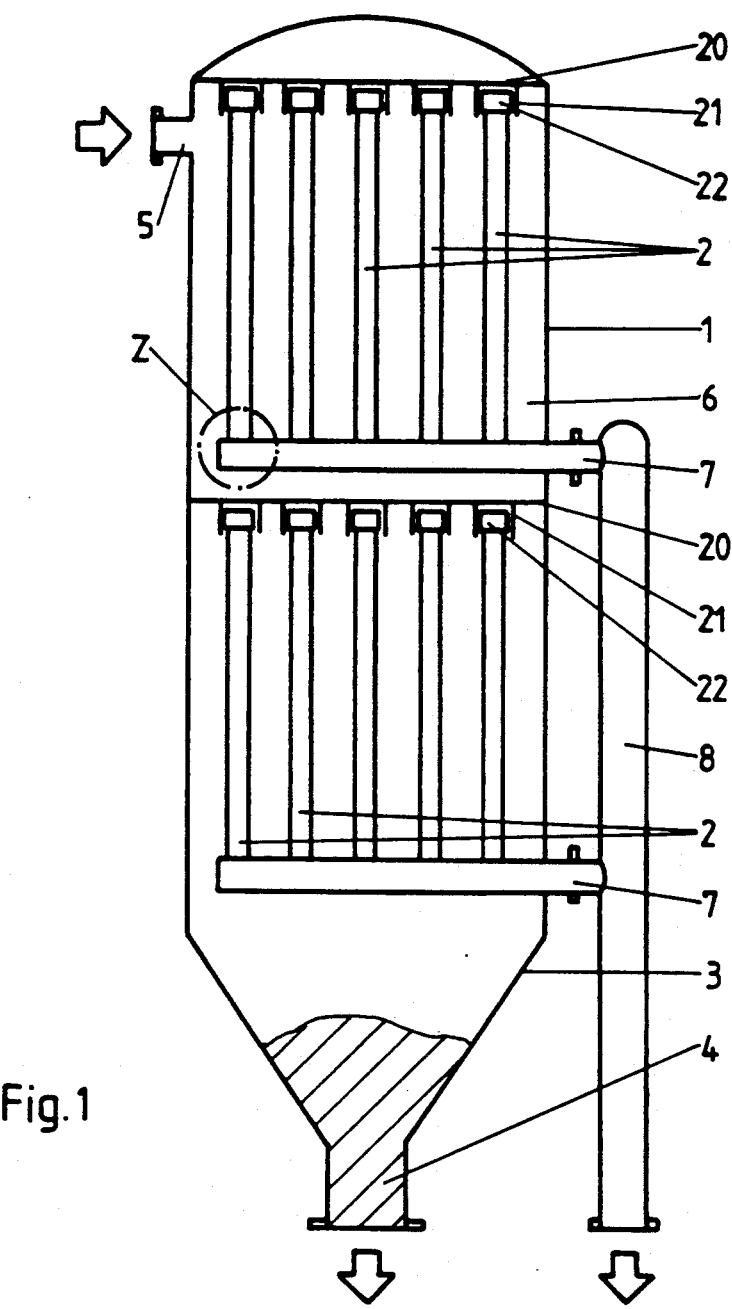
FIG. 1 is a schematic longitudinal section through a device for filtering gases.

The device for filtering hot, dust-laden gases consists of a cylindrical housing 1 that accommodates filter tubes 2. The bottom of housing 1 is in the shape of a funnel 3. The funnel collects the precipitated dust and merges into a dust outlet 4. Housing 1 has an intake 5 for dirty gas and comprises a dirty-gas section and a clean-gas section.

The dirty-gas section is constituted by the interior 6 of the housing itself and the clean-gas section by collection channels 7 that are accommodated inside the housing and extend out through its wall to removal lines 8. The embodiment illustrated in FIGS. 1 and 2 has several levels of adjacent horizontal channels 7.

Each tube 2 consists of a hollow structure 9 with a porous wall, preferably ceramic, although metals and metal compounds can also be employed in certain situations. Each hollow structure 9 is a prism of any desired outer cross-section and a preferably cylindrical inner cross-section. One end is closed off by a lid 10 and the other left open to provide an exit.

Tubes 2 are accommodated in housing 1 with the outer surface of each hollow structure 9 facing the dirty-gas section and its inside communicating with the clean-gas section. The edge 11 around the exit from each tube 2 constitutes a base. The tube rests in an opening 12 in a counterpart in the clean-gas section with lid 10 facing up and with edge 11 forced against the counterpart by its own weight. The pressure exerted by the dirty gas is greater than that exerted by the clean gas by a difference created by filter tubes 2. The difference parallels the tubes' weight and accordingly augments their downward force.

The opening 12 in the counterpart tapers in and merges into a central bore 13. The counterpart can consist of a mouthpiece 14 secured to each channel 7. Channels 7 have perforations 15 in the top. Each mouthpiece 14 rests coaxially in a perforation 15 in a channel 7. The inside diameter of a hollow structure 9, the inside diameter of the bore 13 through a mouthpiece 14, and the diameter of the perforation 15 in each channel 7 are preferably equal.

Figure 3:
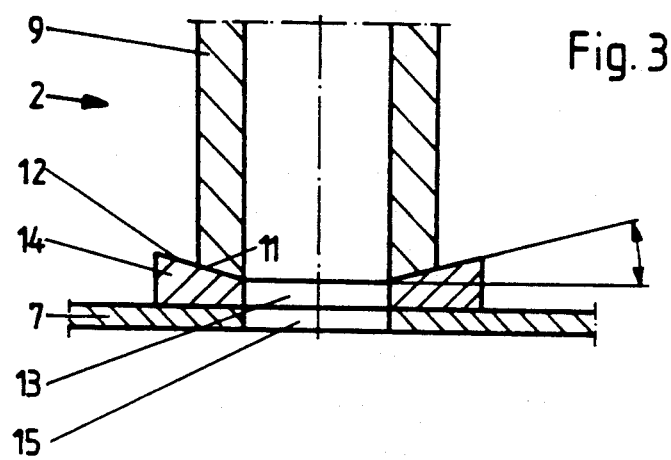
Figure 4:
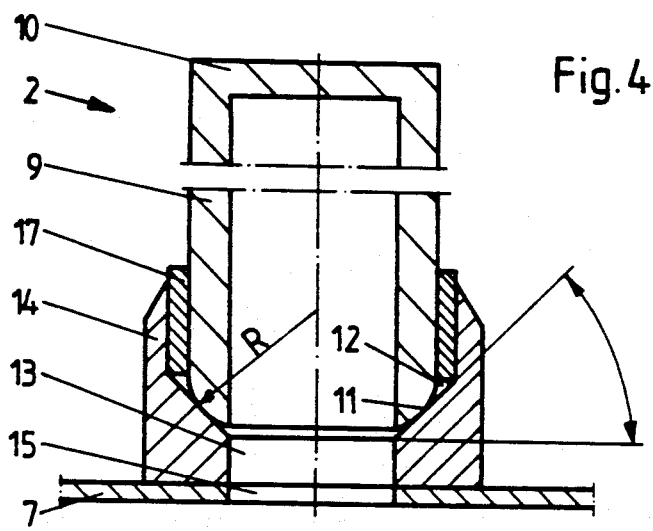
Figure 6:
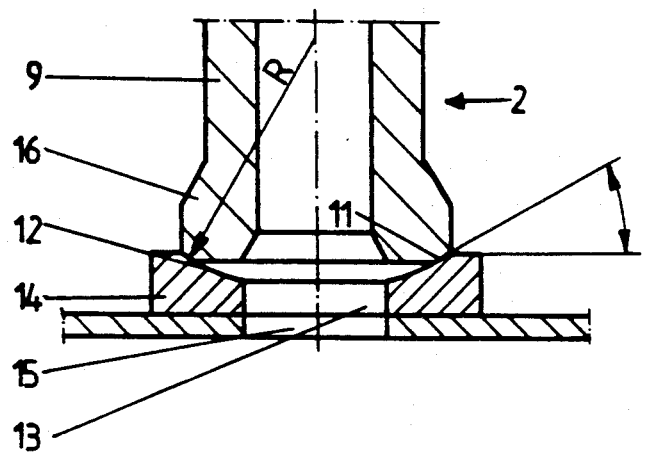
Figure 7:
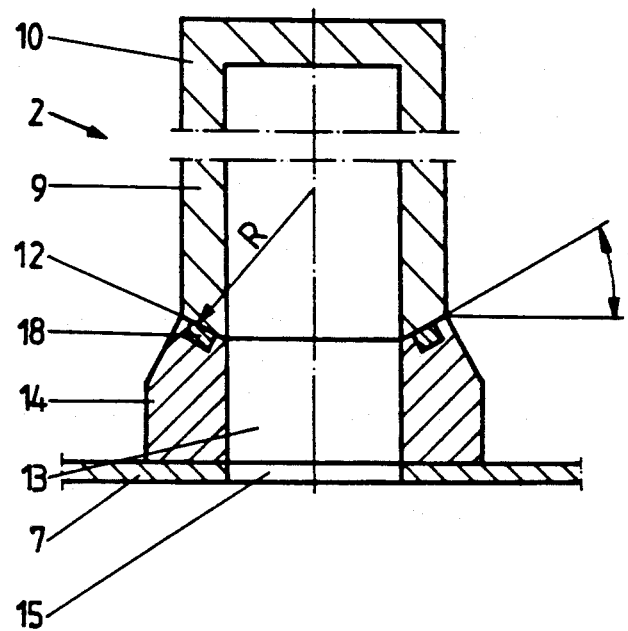

The edge 11 of each tube 2 and the opening 12 in each mouthpiece 14 are machined rotationally symmetrical. The machining center line is the theoretical longitudinal axis of tube 2. Both edge 11 and opening 12 can be conical and rest at the same angle on a circular-conical surface (FIG. 3). Edge 11 can also be convex. Opening 12 can also be convex (FIG. 4) and can rest on a spherical surface (FIG. 6) with a radius R equalling that of edge 11. The radius R of edge 11 can also be shorter than that of opening 12. As illustrated in FIG. 6, each tube 2 can have a collar 16 with a face that constitutes the base.

The aperture of opening 12 can range between 15° and 45°. Particularly practical is an angle of 30°. When deciding on an aperture it must be kept in mind that tubes 2 must be able to center themselves automatically and that any difference between the thermal expansions of tubes 2 and mouthpieces 14 must not lead to leaks or compress the tube as the materials cool. The tubes 2 must also be allowed to tilt to a certain extent in all directions without damage or leakage.

The seat between the edge 11 of each tube 2 and the opening 12 in each mouthpiece 14 is theoretically circular. Such a seat will adequately seal off the current of dirty gas without accommodating a deformable seal, the only prerequisite being unexceptionable machining of the edge 11 of 2 and of the opening 12 in mouthpiece 14. Mouthpiece 14 can in some situations also have a component that surrounds the tube, leaving a gap between them. The gap is completely occupied by fireproof felt 17. A groove 18 can extend around the opening 12 in mouthpiece 14 and accommodate a deformable seal, of fireproof felt for example. A piece of ceramic can be positioned between the edge 11 of tube 2 and the opening 12 to reduce any friction that may accompany slight motions on the part of tube 2 and to enhance the seal between the dirty-gas section and the clean-gas section. The ceramic can be a curing putty and may in any case bond to one of the contact surfaces.

Figure 5:
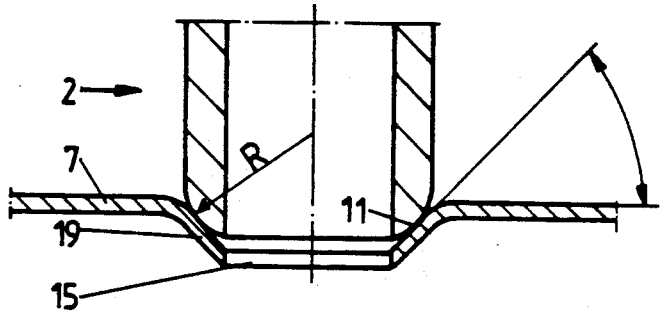

The edge 19 that around each perforation 15 in the channels 7 in the embodiment illustrated in FIG. 5 is sunk and functions as a counterpart.

Figure 8:
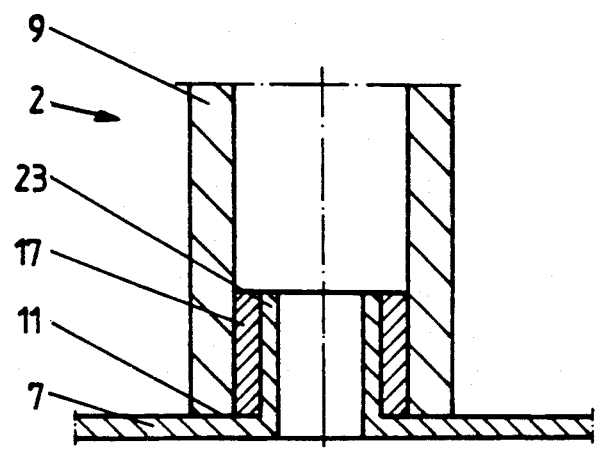

As will be evident from FIG. 8, each tube 2 can also surround a nipple 23 that is connected to the counterpart, with a layer of fireproof felt 17 between the nipple and the inner surface of the tube.

As previously described herein, each tube 2 rests upright with its exit at the bottom on a counterpart. Above each upright tube 2 is a holder 21, mounted on a special support 0. Each holder 21 radially loosely surrounds the upper end of tube 2, which is closed off by a lid 10. Instead of the special support, each holder 21 can also be mounted on a collection channel 7 above each series of tubes 2. Tubes 2 can also be weighted down by a weight 22.

Figure 2:
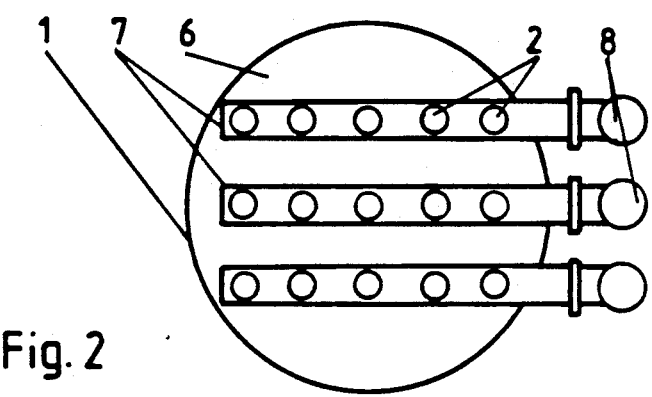
FIG. 2 is a top view of the device illustrated in FIG. 1, and FIGS. 3 through 8 are details of the area Z in FIG. 1 of various embodiments.

The clean-gas section in the housing 1 illustrated in FIGS. 1 and 2 consists of the individual collection channels 7 that support groups or rows of tubes 2. Channels are shaped and oriented to ensure that the dust collecting on the outer surfaces of tubes 2 will not accumulate on the channels but will drop into funnel 3. This motion can be augmented with vibrators or nozzles when desirable.

The filtering device's housing 1 can also be divided into a dirty-gas section and a clean-gas section by a perforated plate, in which case tubes 2 will be positioned coaxially to the perforations in the plate by means of the counterparts illustrated in FIGS. 3 through 8.

I claim:

1. An arrangement for filtering hot, dust-laden gases comprising: a closed housing; filter tubes in said housing; a dirty-gas section and a clean-gas section in said housing; said filter tubes comprising closed hollow members having at least one exit communicating with said clean-gas section, said exit having an edge around said exit; said clean-gas section having a counterpart to said edge, said edge being a base resting against said counterpart dependent on weight of a tube so that differences between pressure of gas in said dirty-gas section and gas in said clean-gas section are directed parallel; said filter tubes being hollow ceramic elements having a covering portion and being flowed through by gas to be cleaned from outside to inside of said ceramic elements, pressure of dirty gas being substantially greater than pressure of clean gas and differences of said pressures and weight of said tube pressing said tube against said counterpart, said pressure differences and tube weight acting in the same direction to form a seal between said tube and said counterpart.

2. An arrangement as defined in claim 1, wherein said tubes rest radially loose on said base.

3. An arrangement as defined in claim 1, wherein said counterpart has a central bore with a rotationally symmetrical opening 12 tapering outward in an upward direction.

4. An arrangement as defined in claim 3, wherein said tube has an inside space with a diameter, said central bore in said counterpart having a diameter equal substantially to said diameter of said inside space.

5. An arrangement as defined in claim 3, wherein said edge and said rotationally symmetrical opening rest on a spherical surface.

6. An arrangement as defined in claim 5, wherein said edge and said opening have equal radii.

7. An arrangement as defined in claim 5, wherein said edge has a radius shorter than the radius of said opening.

8. An arrangement as defined in claim 3, wherein said opening rests on a circular-conical surface deviating from a spherical surface.

9. An arrangement as defined in claim 3, wherein said opening rests on a paraboloid surface deviating from a spherical surface.

10. An arrangement as defined in claim 1, wherein said clean-gas section has at least one collection channel extending out of said housing and having perforations for receiving said filter tube.

11. An arrangement as defined in claim 1, including a perforated plate separating said clean-gas section from said dirty-gas section.

12. An arrangement as defined in claim 10, wherein said counterpart is coaxial with said perforations in said collection channel.

13. An arrangement as defined in claim 11, wherein said counterpart is coaxial with perforations in said plate.

14. An arrangement as defined in claim 12, wherein each of said perforations has an edge that is sunk in and functions as a counterpart.

15. An arrangement as defined in claim 11, wherein each perforation of said perforated plate has an edge that is sunk in and functions as a counterpart.

16. An arrangement as defined in claim 3, wherein said opening is surrounded by a groove in said counterpart; and seal means in said groove.

17. An arrangement as defined in claim 3, including a layer of curing ceramic between said edge of said tube and said opening in said counterpart.

18. An arrangement as defined in claim 3, wherein said opening has a taper between 15° and 45°.

19. An arrangement as defined in claim 3, wherein said opening has a taper of substantially 30°.

20. An arrangement for filtering hot, dust-laden gases comprising: a closed housing; filter tubes in said housing; a dirty-gas section and a clean-gas section in said housing; said filter tubes comprising closed hollow members having at least one exit communicating with said clean-gas section, said exit having an edge around said exit; said clean-gas section having a counterpart to said edge, said edge being a base resting against said counterpart dependent on weight of a tube so that differences between pressure of gas in said dirty-gas section and gas in said clean-gas section are directed parallel; said filter tubes being hollow ceramic elements having a covering portion and being flowed through by gas to be cleaned from outside to inside of said ceramic elements, pressure of dirty gas being substantially greater than pressure of clean gas and differences of said pressures and weight of said tube pressing said tube against said counterpart, said pressure differences and tube weight acting in the same direction to form a seal between said tube and said counterpart; said tubes resting radially loose on said base; said counterpart having a central bore with a rotationally symmetrical opening tapering outward in an upward direction; said tube having an interior space with diameter equal substantially to the diameter of said central bore; said edge and said opening resting on a spherical surface; said edge and said opening having substantially equal radii; said clean-gas section having at least one collection channel extending out of said housing and having perforations for receiving said filter tubes; a perforated plate separating said clean-gas section from said dirty-gas section; said counterpart being coaxial with said perforations in said collection channel; each of said perforations in said collection channel having an edge that is sunk in and functions as a counterpart; said opening being surrounded by a groove; seal means in said groove; a layer of curing ceramic between said edge of said tube and said opening in said counterpart; said opening having a taper between 15° and 45°.

* * * * *